Nov. 6, 1945.   I. N. PALLEY   2,388,365
RETRACTABLE LANDING GEAR FAIRING
Filed April 24, 1943     8 Sheets-Sheet 1

INVENTOR
*I. NEVIN PALLEY*
BY
ATTORNEY

INVENTOR
I. NEVIN PALLEY
ATTORNEY

Nov. 6, 1945.   I. N. PALLEY   2,388,365
RETRACTABLE LANDING GEAR FAIRING
Filed April 24, 1943   8 Sheets-Sheet 3

INVENTOR
*I. NEVIN PALLEY*
BY
ATTORNEY

Nov. 6, 1945.   I. N. PALLEY   2,388,365
RETRACTABLE LANDING GEAR FAIRING
Filed April 24, 1943   8 Sheets-Sheet 4

INVENTOR
*I. NEVIN PALLEY*
BY
ATTORNEY

Nov. 6, 1945.   I. N. PALLEY   2,388,365
RETRACTABLE LANDING GEAR FAIRING
Filed April 24, 1943   8 Sheets-Sheet 5

INVENTOR
*I. NEVIN PALLEY*
BY
ATTORNEY

Nov. 6, 1945.  I. N. PALLEY  2,388,365
RETRACTABLE LANDING GEAR FAIRING
Filed April 24, 1943    8 Sheets-Sheet 6
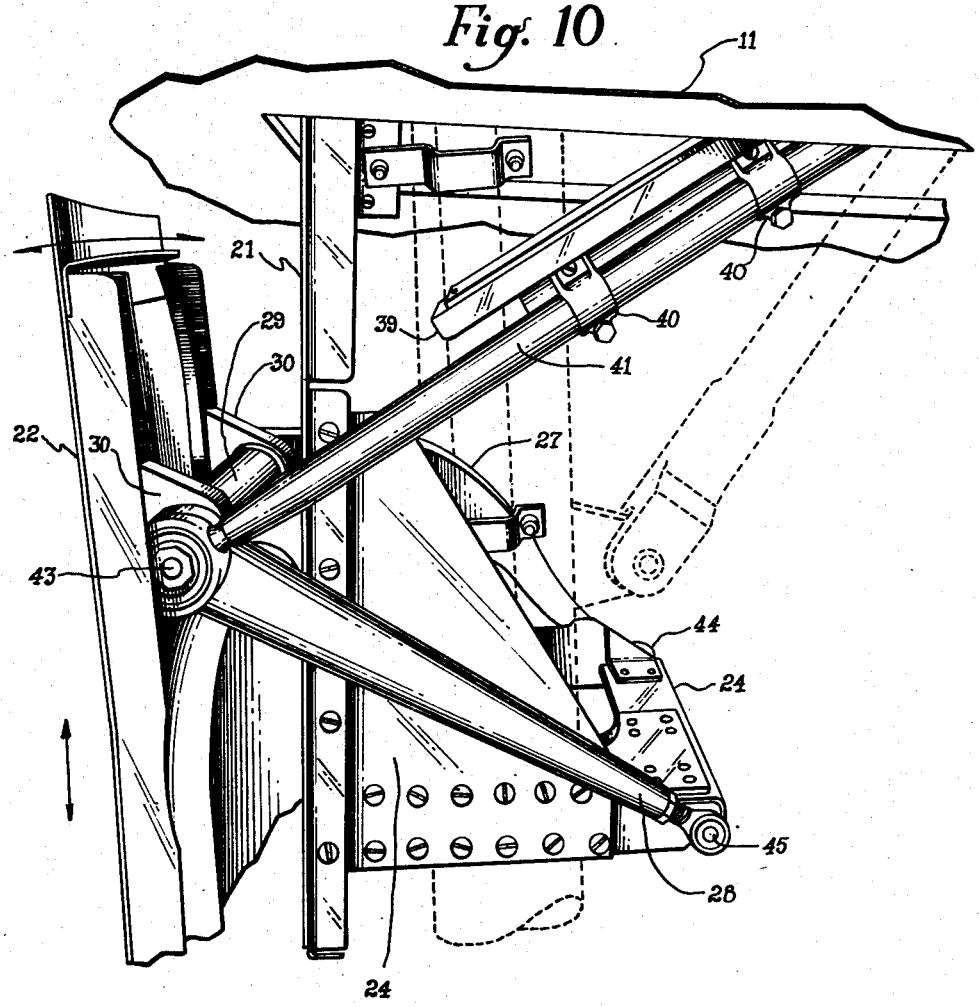
INVENTOR
*I. NEVIN PALLEY*
BY
ATTORNEY

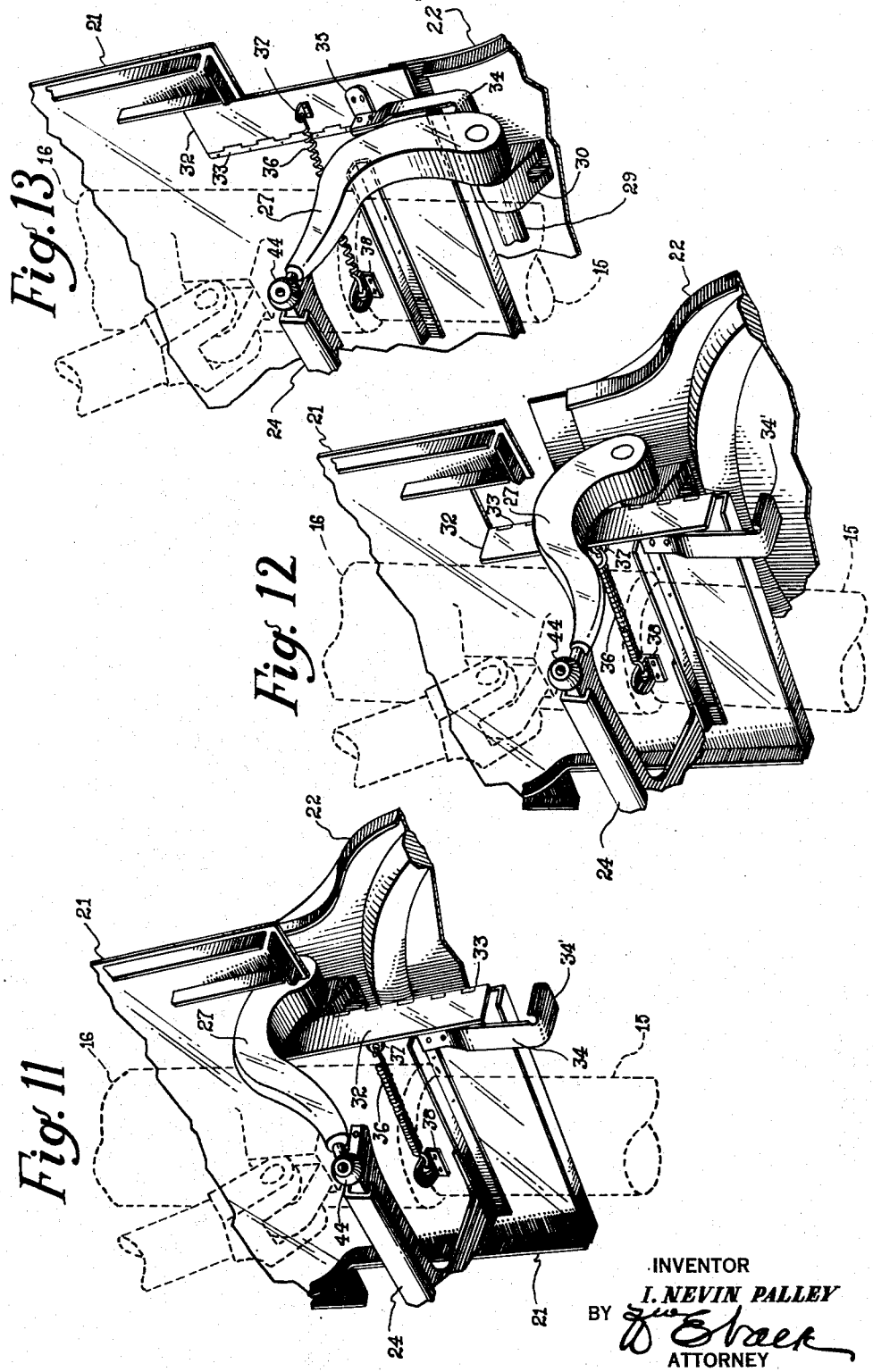

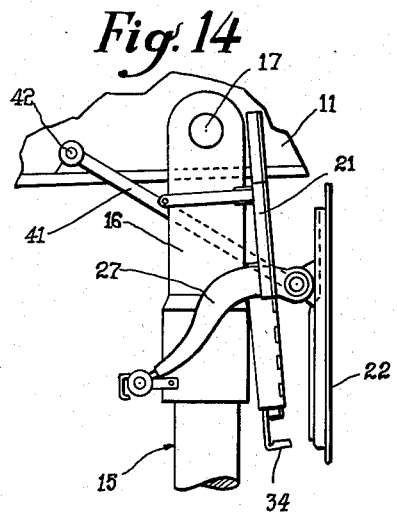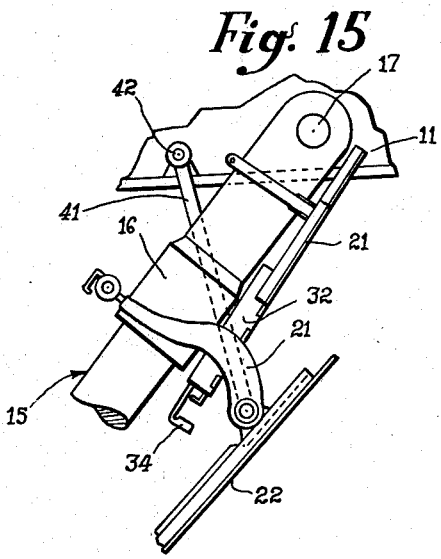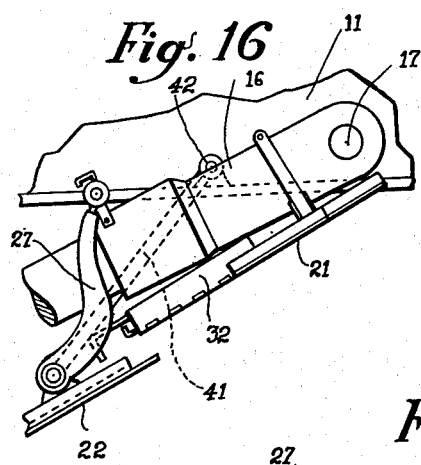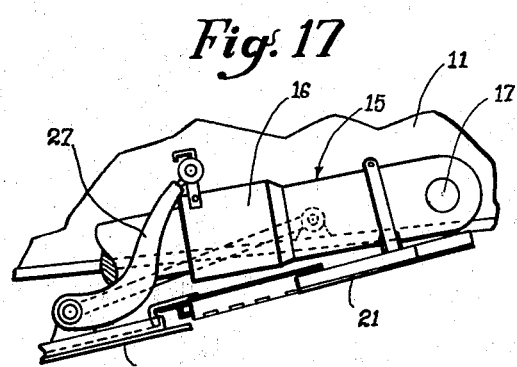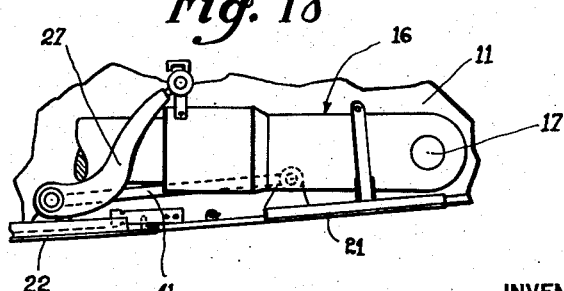

Patented Nov. 6, 1945

2,388,365

UNITED STATES PATENT OFFICE 2,388,365

RETRACTABLE LANDING GEAR FAIRING

I. Nevin Palley, Oronoque, Conn., assignor to Curtiss-Wright Corporation, a corporation of Delaware Application April 24, 1943, Serial No. 484,446

6 Claims. (Cl. 244—102)

This invention relates to retractable landing gear of airplane and more particularly to means for handling cover plates used for closing the landing gear well in the body of the airplane upon the landing gear being retracted into it.

It is an object of the present invention to provide a closure means which will completely close the landing gear well when the landing gear is retracted.

It is another object of the invention to provide means for retracting one of the covering plates so that it will be free of the ground when the landing gear is in its down or operative position.

It is still another object of the invention to provide a means for handling the cover plates for a landing gear well which is operated automatically by the landing gear itself.

According to the present invention, the closure means is made up of a plurality of cover plates adapted to be automatically pieced together to finally and totally close the landing gear well. In order to have one of the plates free of the ground upon the landing gear being lowered, the one plate and minor plates are movable with and with respect to the landing gear while another plate closer to the root of the landing gear is fixed to and only movable with the landing gear.

For other objects and for a better understanding of the invention, reference may be had to the following detailed description taken in connection with the accompanying drawings, in which Fig. 1 is a front elevation of a portion of an airplane with retractable landing gear provided with recess closing cover plates constructed according to my invention.

Fig. 10 is an enlarged perspective view of the linkage mechanism for the principal movable cover plate.

Figs. 11, 12, and 13 are enlarged perspective views of the mechanism of the invention shown in various positions.

Figs. 14, 15, 16, 17, and 18 are more or less diagrammatic views of cover plates and their operating mechanisms at various positions of the same during the process of being closed.

Figure 1:
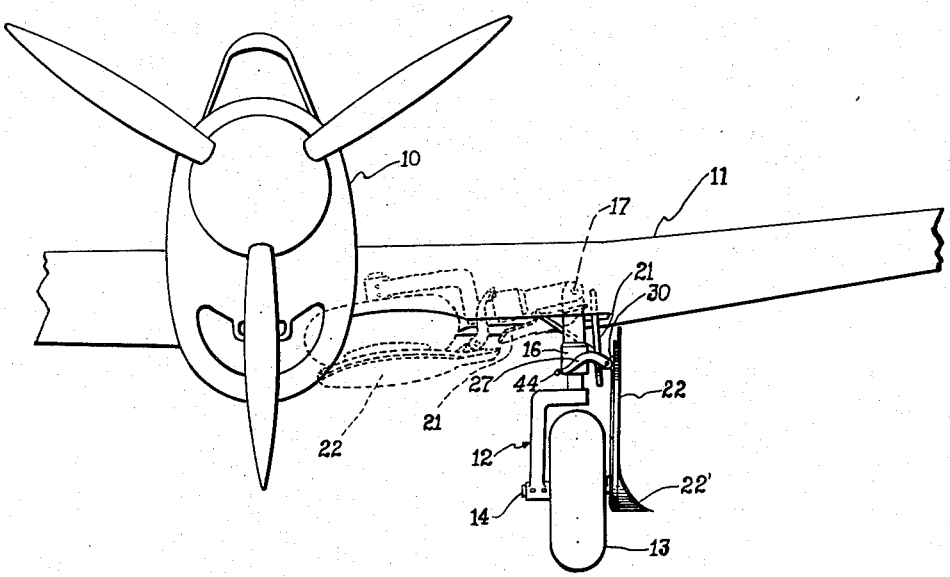
Figure 2:
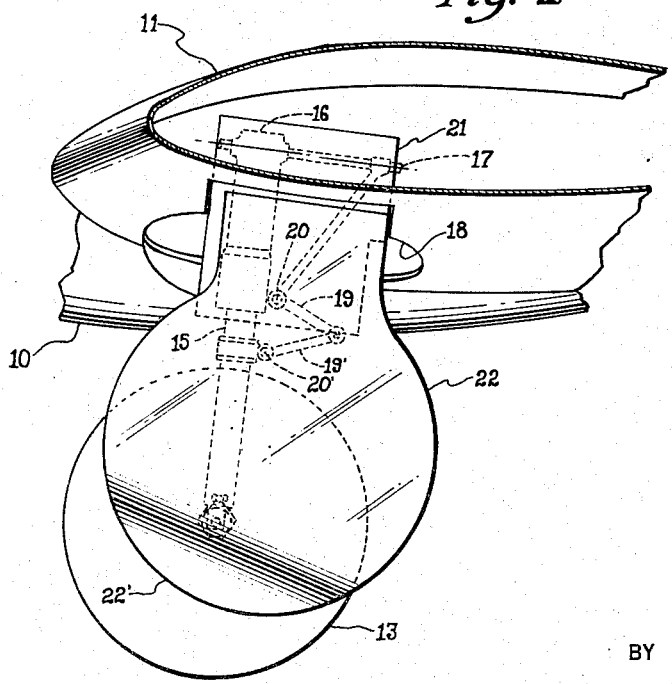
Fig. 2 is a side elevational view on an enlarged scale of the cover plates of the gear shown in Fig. 1 and with the landing gear in its lowered position.

Referring in detail to the drawings wherein similar characters will refer to similar parts throughout the several views, 10 is a section of the body of an airplane having a pair of wing sections which are shown at 11, and a retractable landing gear comprising a pair of assemblies. The left hand assembly only being shown and designated 12. For the sake of illustration and inasmuch as both assemblies are alike except that one is reversed as to the other, description of one will suffice for both. The wheel 13 is supported on the axle 14 which is fixed to the tubular strut 15, said strut being telescoped into the upper strut section 16 which is pivoted as at 17 into a recess 18 within the wing 11. Relative rotation of a lower strut section 15' of strut 15 in the upper strut section 16 is prevented by means of hinged links 19 and 19' pivoted to the said struts as at 20 and 20', Fig. 2.

Means for closing the recess 18 upon retraction of the landing gear 12 is provided by the covers 21 and 22. Cover 21 is immovably mounted on brackets 23 and 24 which are in turn attached to the strut 16, Figs. 6, 8, 9, and 10. The cover 22 has fairing 22' and is movably attached to the strut sections 15' and 16 by means of a slide 25 which engages a headed stud 26 secured to the axle 14, and to arms 27 and 28 mounted on a bar 29 which is pivoted to brackets 30 on the cover 22. Flexible shields 31 prevent foreign matter from entering the slide 25.

An auxiliary closure plate 32 is movably hinged to the cover 21 at 33, said plate being provided with an actuating finger 34 fixed to a bracket 35 on plate 32, Figs. 11-13. Said plate is also provided with a spring 36 one end of which is flexibly attached to the plate 32 at 37, the opposite end being attached to a lug 38 on the strut section 16. A cover strip 39 is fixed by means of brackets 40 to a link 41, Fig. 10. One end of the link 41 is pivoted to the wing 11 at 42, while the opposite end is pivoted at 43 to the bar 29, Figs. 6, 8, 9, and 10. The arms 27 and 28 are pivoted to the bracket 24 at 44 and 45 respectively.

Figure 3:
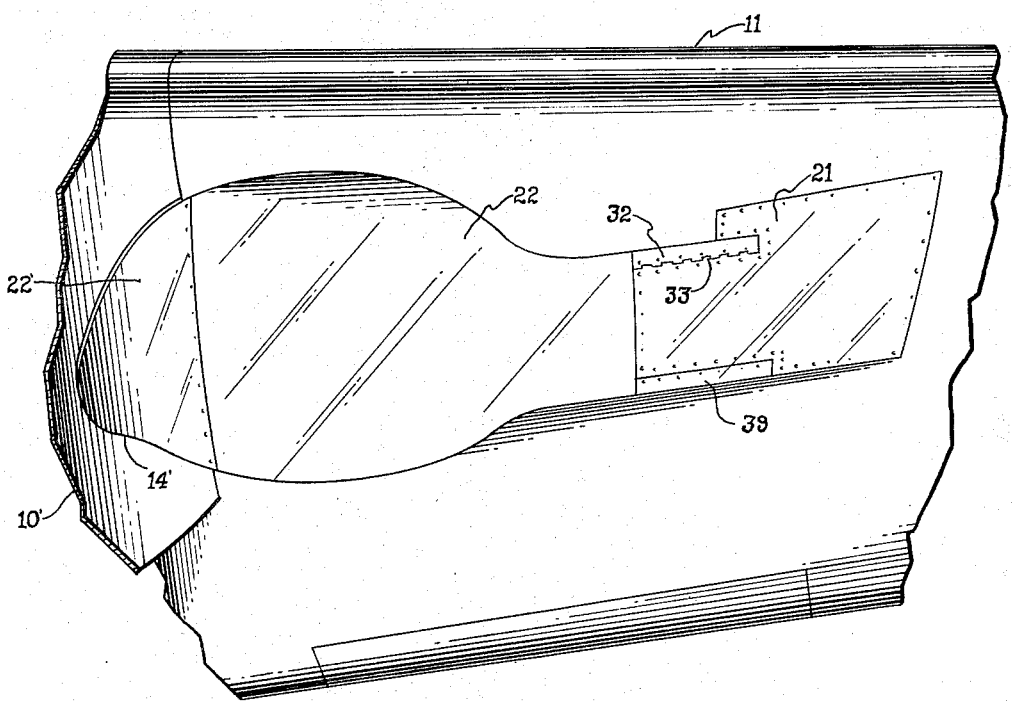
Fig. 3 is a perspective view of the cover plates in a closed position as viewed from underneath of the airplane.
Figure 4:
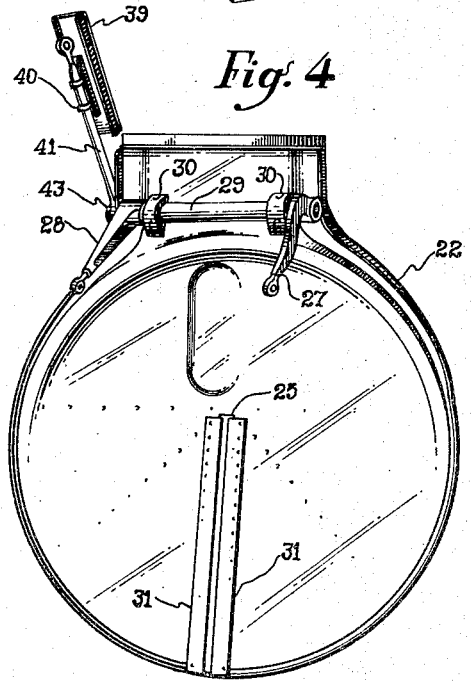
Fig. 4 is a perspective view of the principal cover plate and one minor plate looking at the inside faces thereof.
Figure 5:
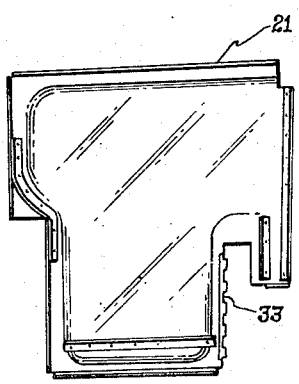
Fig. 5 is a plan view of the inner cover plate which is made rigid with the landing gear looking at the inside face thereof.
Figures 6, 7:
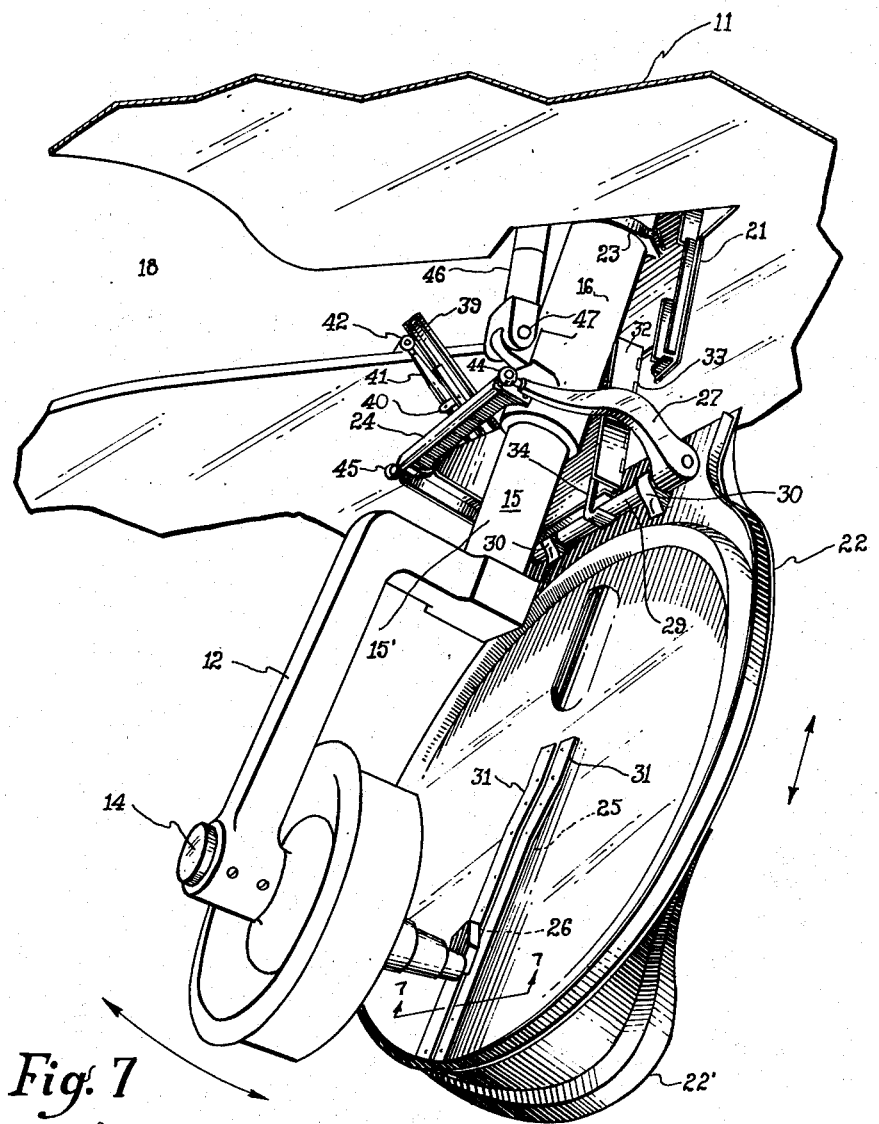
Fig. 6 is an enlarged perspective view of the landing gear and its cover plates in an intermediate position during retraction or extension.
Fig. 7 is a detail sectional view taken along the line 7—7 of Fig. 6.
Figure 8:
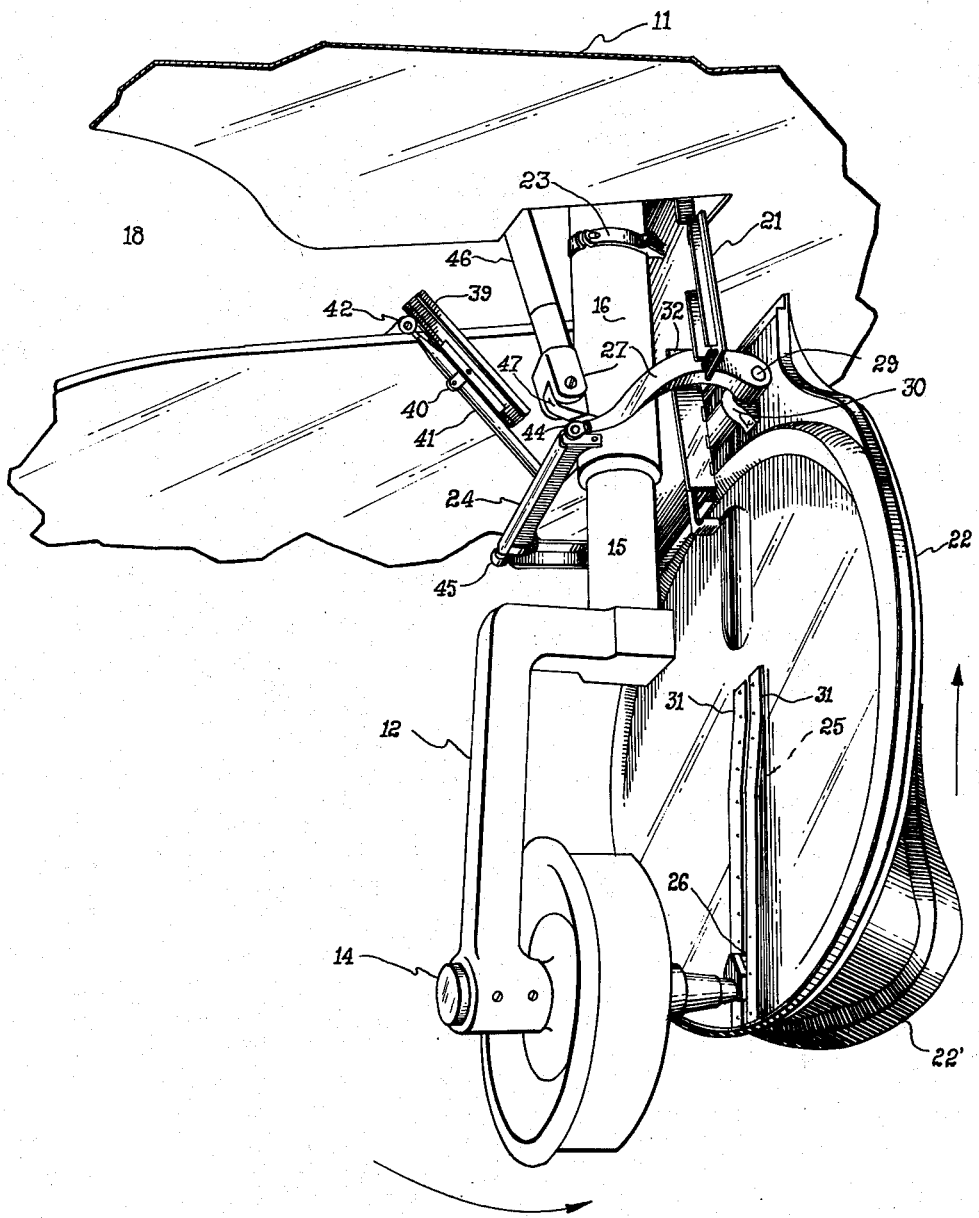
Fig. 8 is an enlarged perspective view of the gear fully extended and its cover plates fully raised.
Figure 9:
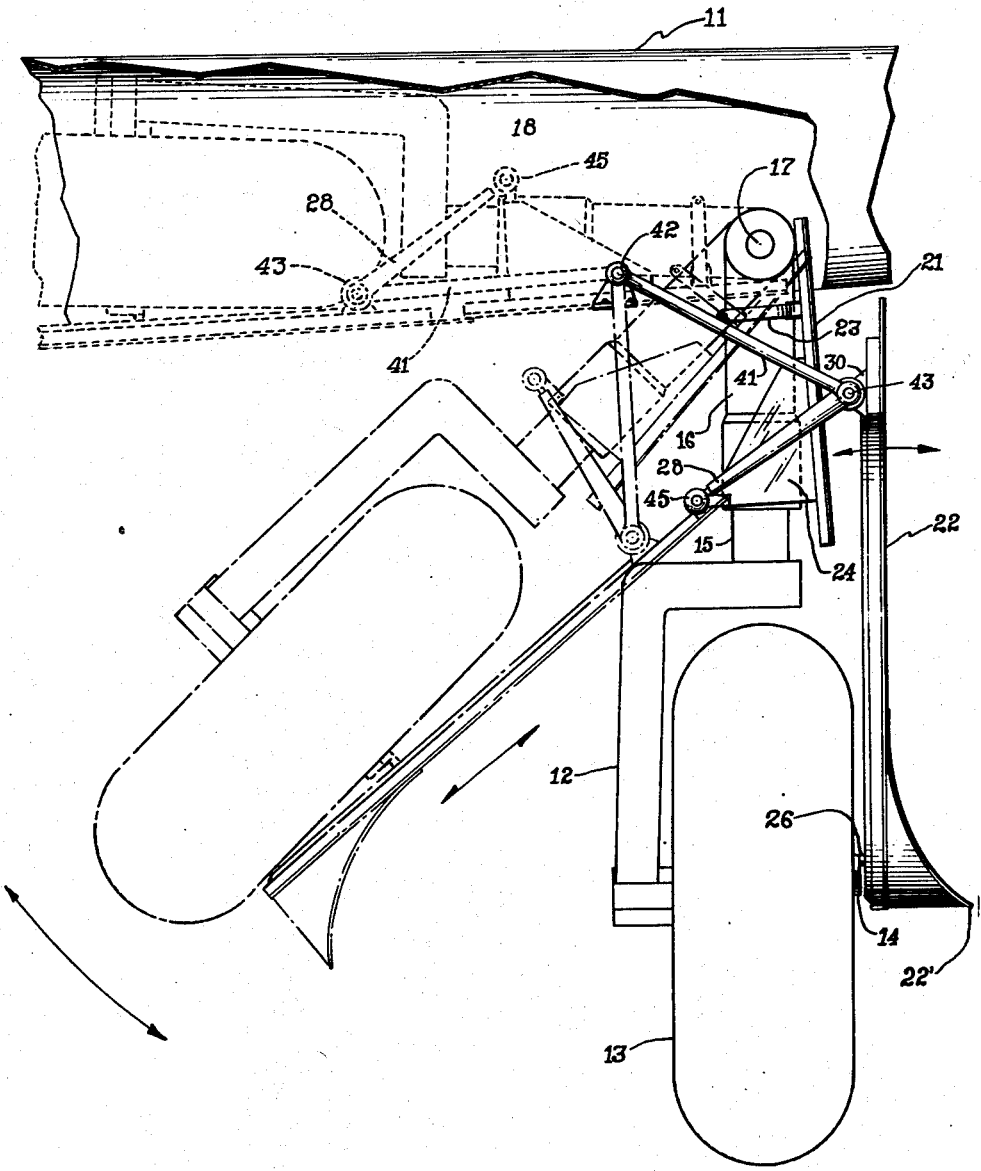
Fig. 9 is an enlarged front elevational view of a portion of the wing with the landing gear in its down position and illustrating the manner in which the cover plate linkages are operated.

The landing gear 12 is retracted inwardly and upwardly by means not shown but connected to the upper end of the link 46 which is pivoted to a lug 47 on the strut section 16. During the retracting travel of the gear the cover 21 being positively fixed to the strut 16 moves with it. The cover 22 however, moves both with and with respect to the movement of tubular strut. While the gear is in the extended or lowered position the cover 22 will be in the raised position as shown in Figs. 1, 2, 8, and 9 which position gives the fairing ample clearance from the ground for taxiing. As the gear is retracted the link 41 being pivotally fixed to the wing 11 forces arms 27 and 28 to swing toward the wheel which movement through the bar 29 and brackets 30 causes the cover 22 to slide toward the bottom of the wheel. As this swinging movement continues the inside top of the cover 22 presses against the foot 34' of the finger 34 which engagement causes the cover 32 to rotate 90° thereby bringing it flush with the lower wing surface so that when the retracting movement is finally completed, all said covers and strip will produce a perfectly flush cover for the entire landing gear as shown in Fig. 3, the cover strip 39 having been brought up with the link 41.

It should now be apparent that there has been provided a closure means which will totally close the landing gear well automatically as the landing gear is raised into the landing gear well and which, while being operated by the landing gear, will free itself of the ground as the landing gear and the closure means is lowered.

While various changes may be made in the detail construction it shall be understood that such changes shall be within the spirit and scope of the present invention as defined by the appended claims.

I claim as my invention:

1. In combination, an airplane having a landing gear well opening therein, a landing gear adapted to be retracted into the landing gear well, said landing gear having inner and outer end portions, a cover plate adapted to close the well immediate the inner end portion of the landing gear and arranged for movement with the landing gear, a second cover plate designed to close the gear well opening immediate the outer end portion of the landing gear, and linkage mechanism connected to the landing gear and the second cover plate and adapted to react against the airplane upon the landing gear being moved to its lowered position for sliding said second cover plate into a position overlapping the first-mentioned cover plate and free of contact with the ground, said first-mentioned cover plate including a cut-away portion formed to permit the passage therethrough of a part of the linkage mechanism, and a minor cover plate carried by the linkage mechanism for opening or closing the cut-away portion as the landing gear is operated.

2. In combination, an airplane having a landing gear well therein, a landing gear adapted to be retracted into the landing gear well, a cover plate connected to the landing gear for movement with the landing gear to close a part of the landing gear well, a second cover plate for closing another part of the landing gear well, linkage mechanism connected to the landing gear and the second cover plate and adapted to react against the airplane for moving the second cover plate outwardly and into an overlapped position in front of the first-mentioned cover plate when said landing gear is extended, said first-mentioned cover plate having a cut-out portion to permit the passage of the linkage mechanism therethrough as the landing gear is extended, and a minor cover plate adapted to fit the cut-away portion also connected to the linkage mechanism to be positioned thereby to close off the cut-away portion of the first-mentioned cover plate as said landing gear is retracted into said well.

3. In combination, an airplane having a landing gear well therein, a landing gear adapted to be retracted into the landing gear well, a cover plate connected to the landing gear for movement with the landing gear to close a part of the landing gear well, a second cover plate for closing another part of the landing gear well, linkage mechanism connected to the landing gear and the second cover plate and adapted to react against the airplane for moving the second cover plate outwardly and into an overlapped position in front of the first-mentioned cover plate, said first-mentioned cover plate having a cut-out portion to permit the passage of the linkage mechanism therethrough as the landing gear is extended, and a minor cover plate for the cut-out portion hinged to the first-mentioned cover plate and biased to an open position, said minor cover plate being closed by the second cover plate as said landing gear is retracted into said well.

4. In combination, an airplane body having a landing gear well therein, a landing gear adapted to be retracted into the landing gear well, a cover plate connected to the landing gear for movement with the landing gear to close off a part of the landing gear well, a second cover plate for closing off another part of the landing gear well, said first-mentioned cover plate having cut-out portions at the respective sides of the same, a pair of spaced links connected between the landing gear and the second cover plate and arranged to pass respectively into the cut-out portions of the first cover plate to effect movement of the second cover plate with respect to the landing gear, means connecting at least one of the spaced links with the airplane body to react thereagainst as the landing gear is operated and to effect the movement of the spaced links and the second cover plate, a pair of minor cover plates for closing off respectively the cut-out portions of the first cover plate, at least one of the minor cover plates carried by the connecting means and adapted to be moved into and out of its closing position thereby.

5. In combination, an airplane having a landing gear well therein, a landing gear adapted to be retracted into said well, said landing gear having inner and outer sections, a cover plate rigidly connected to the inner section of the landing gear and movable therewith to close a part of the landing gear well, a second plate carried by the outer landing gear section for cooperating with said first mentioned plate to close said well, the inner end of said second plate overlying said first-mentioned plate when said landing gear is extended, means responsive to the movement of said landing gear as it is retracted to extend said second plate to a position in which it cooperates with said first-mentioned plate to close said well, an arm carried by the outer section of said landing gear, and means on said second plate for providing a guideway for accommodating the outer end of said arm.

6. In combination, an airplane having a landing gear well therein, a landing gear adapted to be retracted into said well, said landing gear having inner and outer sections, the latter of which carries a landing wheel spindle, a cover plate rigidly connected to the inner section of the landing gear and movable therewith to close a part of the landing gear well, a second plate carried by the outer landing gear section for cooperating with said first-mentioned plate to close said well, the inner end of said second plate overlying said first-mentioned plate when said landing gear is extended, means responsive to the movement of said landing gear as it is retracted to extend said second plate to a position in which it cooperates with said first-mentioned plate to close said well, an extension carried by said landing gear spindle, and means on said second plate for providing a guideway for accommodating said extension.

I. NEVIN PALLEY.